United States Patent
Fang et al.

(10) Patent No.: US 9,753,782 B2
(45) Date of Patent: Sep. 5, 2017

(54) RESOURCE CONSUMPTION OPTIMIZATION

(71) Applicant: Empire Technology Development LLC., Wilmington, DE (US)

(72) Inventors: Jun Fang, Shaanxi (CN); Daqi Li, Shaanxi (CN)

(73) Assignee: EMPIRE TECHNOLOGY DEVELOPMENT LLC, Wilmington, DE (US)

( * ) Notice: Subject to any disclaimer, the term of this patent is extended or adjusted under 35 U.S.C. 154(b) by 101 days.

(21) Appl. No.: 14/655,407

(22) PCT Filed: Apr. 24, 2014

(86) PCT No.: PCT/CN2014/076112
§ 371 (c)(1),
(2) Date: Jun. 25, 2015

(87) PCT Pub. No.: WO2015/161480
PCT Pub. Date: Oct. 29, 2015

(65) Prior Publication Data
US 2016/0253215 A1    Sep. 1, 2016

(51) Int. Cl.
*G06F 9/46*      (2006.01)
*G06F 9/50*      (2006.01)
(Continued)

(52) U.S. Cl.
CPC .......... *G06F 9/5055* (2013.01); *G06F 1/3203* (2013.01); *G06F 1/329* (2013.01);
(Continued)

(58) Field of Classification Search
None
See application file for complete search history.

(56) References Cited

U.S. PATENT DOCUMENTS 8,190,939 B2    5/2012    Fields, Jr. et al.
8,924,539 B2 *  12/2014   Ferris .................... G06F 9/5072
                                                       709/224

(Continued)

FOREIGN PATENT DOCUMENTS

CN    103220337 A    7/2013
CN    103577268 A    2/2014

OTHER PUBLICATIONS

"Dynamic frequency scaling" Accessed at http://web.archive.org/web/20140402012518/http://en.wikipedia.org/wiki/Dynamic_frequency_scaling, Last modified on Feb. 7, 2014, pp. 4.

(Continued)

*Primary Examiner* — Kenneth Tang
(74) *Attorney, Agent, or Firm* — Brundidge & Stanger, P.C.

(57) ABSTRACT

In some examples, in a supply-and-demand system, e.g., a cloud computing environment or an electrical grid, a coordinator may collect resource consumption data from one or more consuming entities. Based on the collected resource consumption data, the coordinator may be configured to predict resource consumption requirement of each consuming entity in a subsequent time period. Further, in accordance with the prediction, the coordinator may allocate the resources to the consuming entities or recycle the resources currently consumed by the consuming entities.

15 Claims, 7 Drawing Sheets

(51) Int. Cl.
H04L 29/08 (2006.01)
G06F 11/30 (2006.01)
G06F 1/32 (2006.01)

(52) U.S. Cl.
CPC .............. *G06F 9/50* (2013.01); *G06F 9/5038* (2013.01); *G06F 11/30* (2013.01); *H04L 67/1008* (2013.01)

(56) References Cited

U.S. PATENT DOCUMENTS

| | | | |
|---|---|---|---|
| 9,009,722 B2* | 4/2015 | Bello | H04L 29/06537 718/104 |
| 2007/0011683 A1* | 1/2007 | Helander | G06F 9/4887 718/104 |
| 2010/0218005 A1 | 8/2010 | Jain et al. | |
| 2012/0053925 A1 | 3/2012 | Geffin et al. | |
| 2013/0086273 A1* | 4/2013 | Wray | G06F 9/5072 709/226 |

OTHER PUBLICATIONS

Chang, B. R., "Hybrid BPNN-Weighted Grey-CLSP Forecasting," Journal of Information Science and Engineering, vol. 21, pp. 209-221 (2005).

Frey, B. J. and Dueck, D., "Clustering by Passing Messages Between Data Points," Science, vol. 315, No. 5814, pp. 972-976 (Feb. 2007).

Heo, S. et al., "Reducing Power Density through Activity Migration," International Symposium on Low Power Electronics and Design (ISLPED), pp. 217-222 (Aug. 2003).

International Search Report and Written Opinion in International Patent Application No. PCT/CN2014/076112 mailed Jan. 30, 2015.

Kim, K.H. et al., "Power-Aware Provisioning of Virtual Machines for Real-Time Cloud Services," Concurrency and Computation: Practice and Experience, pp. 1-7, (Sep. 19, 2002).

Le, K. et al., Reducing Electricity Cost Through Virtual Machine Placement in High Performance Computing Clouds, Proceedings of 2011 International Conference for High Performance Computing, Networking, Storage and Analysis, pp. 1-12 (Nov. 12-18, 2011).

Li, B., et al., "EnaClound: An Energy-saving Application Live Placement Approach for Cloud Computing Environments," IEEE International Conference on Cloud Computing, pp. 17-24 (Sep. 21-25, 2009).

Racu, R. et al., "Methods for power optimization in distributed embedded systems with real-time requirements," Proceedings of the 2006 international conference on Compilers, architecture and synthesis for embedded systems, pp. 379-388 (2006).

Roy, N. et al., "Efficient Autoscaling in the Cloud using Predictive Models for Workload Forecasting," IEEE 4th International Conference on Cloud Computing, pp. 500-507 (2011).

Zheng, Y., et al., "Design of a Power Efficient Cloud Computing Environment: Heavy Traffic Limits and QoS," Technical Report, Ohio State University, pp. 1-17 (Mar. 2012).

* cited by examiner

RESOURCE CONSUMPTION OPTIMIZATION

CROSS-REFERENCE TO RELATED APPLICATION

This Application is the U.S. National Stage filing under 35 US.C. §371 of PCT Application Ser. No. PCT/CN2014/076112 filed on Apr. 24, 2014. The disclosure of the PCT Application is hereby incorporated herein by reference in its entirety.

TECHNICAL FIELD

The technologies described herein pertain generally, but not exclusively, to resource consumption optimization.

BACKGROUND

Unless otherwise indicated herein, the approaches described in this section are not prior art to the claims in this application and are not admitted to be prior art by inclusion in this section.

Examples of a supply-and-demand system may include a cloud computing environment, in which a client device, having a software application executing thereon, consumes computing resources provided by a server; an electrical grid, in which an entity, e.g., a factory, consumes electrical power provided by a power utility plant; etc. Many factors may affect the consumed amounts of such resources. Examples of such factors may include current or seasonal weather; time of day; time of year; calendar events, e.g., holidays; etc. Because such factors may cause variances in resource consumption over time, supply of a corresponding resource may not be proportional to consumption. That is, the supply may exceed or lag behind the demand at various times.

SUMMARY

Technologies are generally described to optimize resource consumption. The various techniques described herein may be implemented in various methods, computer-readable mediums, computer-programmable products, and/or systems.

In some examples, various embodiments may be implemented as methods. Some methods may include collecting historic resource consumption data of an application executing on one or more computing nodes, generating a historic resource consumption pattern based on the historic resource consumption data, generating one or more reference patterns based on the historic resource consumption data, predicting resource consumption requirements of the application for a subsequent execution time period based on the historic resource consumption pattern and the one or more reference patterns, and allocating computing resources of the one or more computing nodes for execution of the application during the subsequent execution time period based on the predicted resource consumption requirements.

In some examples, various embodiments may be implemented as computer-readable mediums having executable instructions stored thereon. Some computer-readable mediums may store instructions that, when executed, may cause one or more processors to perform operations comprising collecting historic power consumption data by a consuming entity that consumes power from one or more power providers, generating a historic power consumption pattern based on the collected historic power consumption data, generating one or more reference patterns based on the generated historic power consumption data, predicting power consumption requirements of the consuming entity for a subsequent time period based on the historic power consumption pattern and the one or more reference patterns, and allocating power from the one or more power providers to the consuming entity during the subsequent time period based on the predicted power consumption requirements.

In some examples, various embodiments may be implemented as systems. Some systems may include: a data collector configured to collect historic resource consumption data of an application that executes on one or more computing nodes; a pattern generator configured to generate a historic resource consumption pattern based on the collected historic resource consumption data, and to generate one or more reference patterns based on the collected historic resource consumption data; a consumption estimator configured to predict resource consumption requirements of the application for a subsequent execution time period based on the historic resource consumption pattern and the one or more reference patterns; and a resource allocator configured to allocate computing resources of the one or more computing nodes for execution of the application during the subsequent execution time period based on the predicted consumption requirements.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

In the detailed description that follows, embodiments are described as illustrations only since various changes and modifications will become apparent to those skilled in the art from the following detailed description. The use of the same reference numbers in different figures indicates similar or identical items. In the drawings.

DETAILED DESCRIPTION

Figure 1:
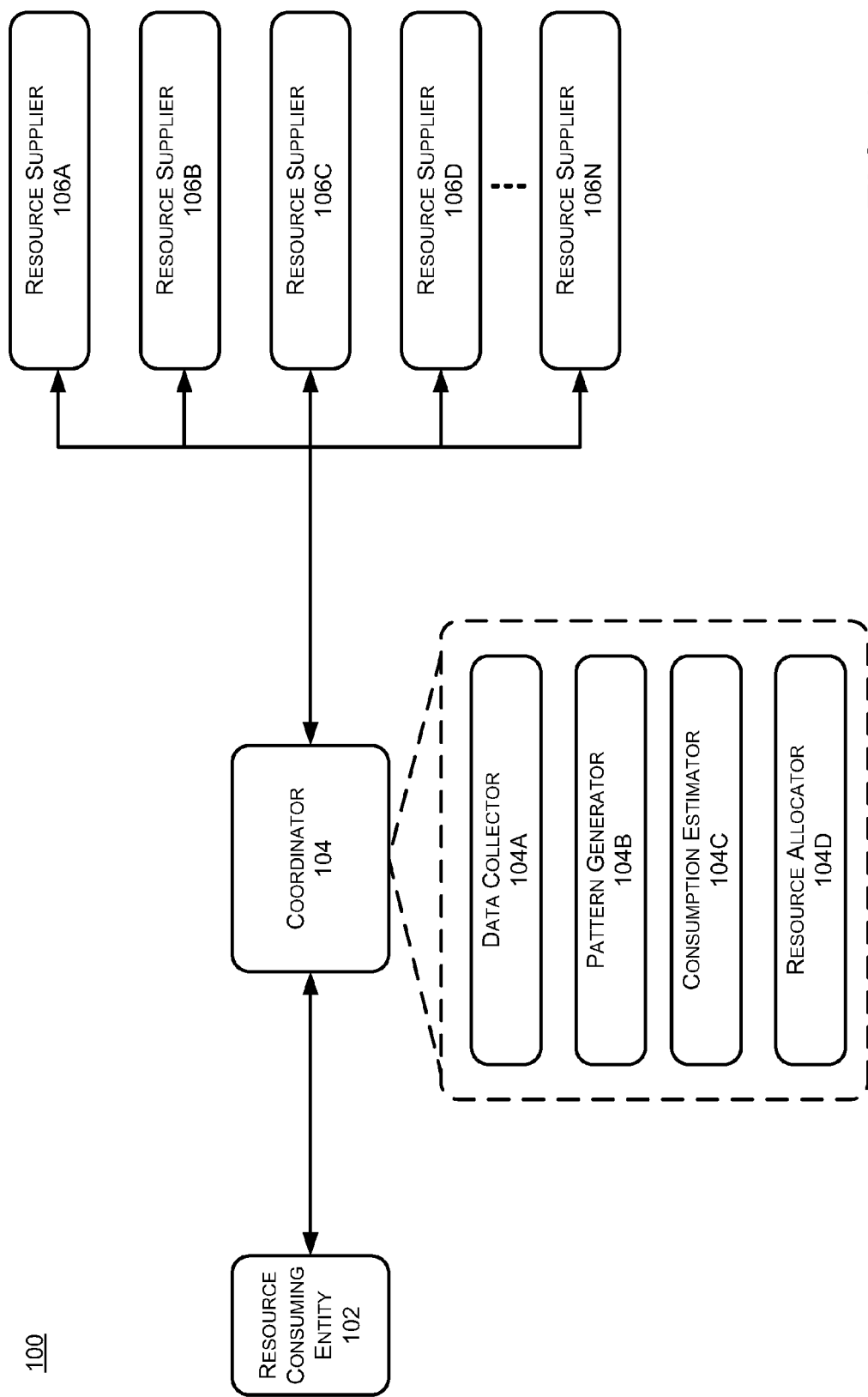
FIG. 1 shows an example supply-and-demand system in which resource consumption may be optimized.

In the following detailed description, references are made to the accompanying drawings, which form a part of the description. In the drawings, similar symbols typically identify similar components, unless context dictates otherwise. Furthermore, unless otherwise noted, the description of each successive drawing may reference features from one or more of the previous drawings to provide clearer context and a more substantive explanation of the current example embodiment. Still, the embodiments described in the detailed description, drawings, and claims are not meant to be limiting. Other embodiments may be utilized, and other changes may be made, without departing from the spirit or scope of the subject matter presented herein. Aspects of the present disclosure, as generally described herein and illustrated in the drawings, may be arranged, substituted, combined, separated, and designed in a wide variety of different configurations, all of which are explicitly contemplated herein.

Briefly stated, in a supply-and-demand system, a coordinator may be configured to allocate a particular resource or type of resource for one or more resource consuming entities. Since the consumption of the resource may vary based on one or more various factors, the coordinator may allocate amounts of the resource to the one or more resource consuming entities in accordance with predicted future resource consumption. The predicted future resource consumption may be determined or calculated based on factors including previous consumption of the resource by the one or more resource consuming entities.

As referenced herein, a supply-and-demand system may refer to a system that includes one or more resource suppliers configured to supply a resource to one or more resource consuming entities based on the demands, e.g., needs, of the respective one or more resource consuming entities. Non-limiting examples of the supply-and-demand system may include a cloud computing environment, an electric grid, a commodity market, or a stock exchange market. For clarity, the following description will make reference to the example supply-and-demand systems in a cloud computing environment and/or an electric grid. However, the embodiments of resource consumption optimization are in no way limited to such examples. In the example of the cloud computing environment, the resource may refer to computing resources supplied by one or more servers of a cloud service provider and consumed by one or more client devices that are configure to execute a software application or to receive an online service. In the example of electrical grid, the resource may refer to electrical power supplied by one or more power utility plants and consumed by residences, office buildings, hotels, places of commerce, places of industry, etc.

FIG. 1 shows an example supply-and-demand system 100 in which resource consumption may be optimized, arranged in accordance with at least some embodiments described herein. Supply-and-demand system 100 may include, at least, a resource consuming entity 102, a coordinator 104, and one or more resource suppliers 106A, 106B, . . . , 106N. Coordinator 104 may include, at least, a data collector 104A, a pattern generator 104B, a consumption estimator 104C, and a resource allocator 104D. Unless context requires specific reference to one or more resource suppliers 106A, 106B, . . . , 106N, individual reference may be made to a "resource supplier 106" and collective reference may be made to "resource suppliers 106" below.

Resource consuming entity 102 may refer to an entity that consumes a resource or a type of resource that is provided by one or more resource suppliers 106. In the example where supply-and-demand system 100 includes a cloud computing environment, resource consuming entity 102 may refer to a client device that is configured to run a software application. When the software application is running on the client device, the client device may consume one or more computing resources. The computing resources may be provided from one or more servers associated with a cloud computing service provider. In at least one other example where supply-and-demand system 100 includes an electric grid, resource consuming entity 102 may refer to a factory, residence, etc., that consumes electrical power generated by one or more power utility plants.

The resource supplied by one or more of resource suppliers 106 may refer to any type of resource or commodity for which consumption may be quantified. In the example where supply-and-demand system 100 includes a cloud computing environment, resources provided by a cloud computing service provider may include computing resources including CPU usage, storage space, network bandwidth, etc. In the example where supply-and-demand system 100 includes an electric grid, resources supplied over an electrical grid may include electrical power. Such examples are not intended to be limiting, but are rather provided as illustrative examples for the purpose of explaining the embodiments herein.

The consumption of a resource by resource consuming entity 102 may vary with time. That is, amounts of a particular resource actually consumed or sought to be consumed by resource consuming entity 102 may fluctuate hourly, daily, weekly, monthly, annually, or in other time increments due to one or more factors such as time of day; time of year; calendar events, e.g., holidays; etc., current or seasonal weather. Other factors that may affect the amount of a particular resource actually consumed or sought to be consumed may include a demand for the particular resource by other resource consuming entities 102. For example, the consumption of computing resources provided by the cloud computing service provider may be higher during holiday season due to large amount of online transactions by multiple resource consuming entities 102.

In the example where supply-and-demand system 100 includes a cloud computing environment, resource consuming entity 102 may submit data regarding the consumption of a resource to coordinator 104 during consumption of the resource, e.g., in real-time, or periodically over an extended period of time. In instances where the submission of data is periodic, the frequency of the submission may be adjustable (that is, adjusted) by coordinator 104 or a system administrator. The submitted data regarding the resource consumption may be recorded by coordinator 104 and/or in one or more associated storage devices. Resource consumption data that references past consumption of a particular resource by resource consuming entity 102 may be referred to as "historic resource consumption data."

Coordinator 104 may refer to a component that may be configured to predict resource consumption requirements of resource consuming entity 102 in or during a subsequent time period ("future resource consumption requirements" hereafter) based on, at least, resource consumption data received from one or more resource consuming entities 102. In at least one example, coordinator 104 may refer to a general purpose computer in supply-and-demand system 100 associated with resource consuming entity 102 and resource suppliers 106. Coordinator 104 may further be configured to determine amounts of the corresponding resource to be supplied by resource suppliers 106 to one or more resource consuming entities 102 in accordance with the predicted future resource consumption requirements.

Coordinator 104 may include, at least, data collector 104A, pattern generator 104B, consumption estimator 104C, and resource allocator 104D.

Data collector 104A may refer to a component that may be configured to passively receive or actively retrieve the resource consumption data from resource consuming entity 102. In the example where supply-and-demand system 100 includes a cloud computing environment, data collector 104A may be configured to receive, from the application running on a client device, e.g., resource consuming entity 102, historic resource consumption data that includes details regarding previous demand and/or consumption of one of the computing resources by the application. Such details may, as a non-limiting example, correlate quantity and time pertaining to the resource consumption.

The historic resource consumption data may be compiled by data collector 104A as the historic resource consumption data, which may serve as a basis for predicting future resource consumption requirements.

Data collector 104A may be configured to provide the compiled historic resource consumption data to pattern generator 104B. In addition to or alternatively, data collector 104A may store the compiled historic resource consumption data in a data storage associated with coordinator 104. In accordance with various example embodiments, data collector 104A may be implemented as hardware, software, firmware, or any combination thereof.

Pattern generator 104B may refer to a component that may be configured to generate a pattern of historic resource consumption based on the received historic resource consumption data to be used to predict future allocation of a particular resource to resource consuming entity 102. One goal or intention of the prediction may be to optimize or improve resource allocation. For example, with regard to the example of a cloud computing service provider, pattern generator 104B may generate a pattern of historic computing-resource usage (e.g., historical consumption pattern 302) that may be articulated on a time-consumption graph as a curve that describes computing resource consumption by resource consuming entity 102 varying with time. Further to such example, a pattern of historic resource consumption may describe CPU usage of an application that varied, e.g., every five seconds, over a most recent 24 hour period. Examples of such graphs will be described below with reference to FIGS. 4 and 5.

Figure 3:
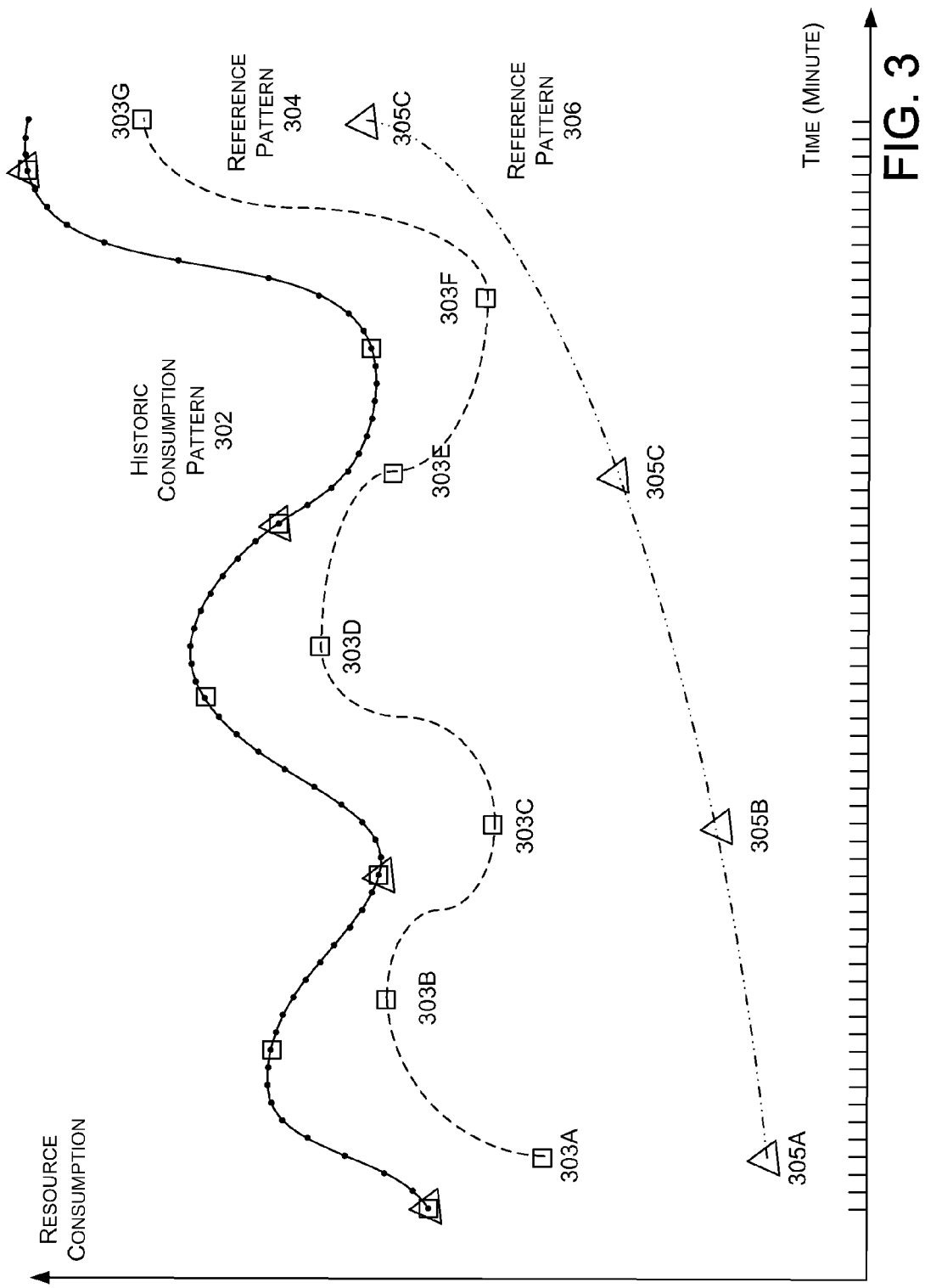
FIG. 3 shows an example historic consumption pattern and one or more reference patterns on which resource consumption optimization may be based.

Additionally, pattern generator 104B may be configured to generate one or more reference patterns, e.g., a reference pattern 304 and a reference pattern 306 which are shown in FIG. 3, based on one or more sampled portions of the historic resource consumption data. That is, pattern generator 104B may generate the one or more reference patterns by sampling the collected historic consumption data at different sampling rates. The different sampling rates may be predetermined and/or further adjusted by a system administrator, which may or may not be a component of coordinator 104. At each of the sampling rates, pattern generator 104B may sample a subset of the historic consumption data to generate one of the one or more reference patterns. For example, pattern generator 104B may sample the computing resource consumption data, e.g., once every minute, once every ten minutes, and once every twenty minutes to generate three subsets of the historic resource consumption data. Reference patterns may be respectively generated for each of the subsets of historic resource consumption data to describe the CPU usage of the application, as varied over the three aforementioned intervals during a period of time, e.g., the past 24 hours. The sampling rates may be adjustable by the aforementioned system administrator.

Consumption estimator 104C may refer to a component that may be configured to predict future resource consumption requirements for resource consuming entity 102 based on the pattern of historic resource consumption and the one or more reference patterns, as will be described in greater detail in accordance with FIG. 4 and FIG. 5. Consumption estimator 104C may generate a summed vector that indicates a variation of the resource consumption in a subsequent time period based on a combination of inertial vectors corresponding to the pattern of historic resource consumption and the one or more reference patterns.

As a part of the prediction, consumption estimator 104C may calculate an inertial vector for each of the reference patterns and the historic resource consumption pattern. For example, an inertial vector 410, as shown in FIG. 4, an inertial vector 502 and an inertial vector 504, as shown in FIG. 5, may be respectively calculated for each of the one or more reference patterns. As referenced herein, the inertial vector may depict an impact on the predicted resource consumption requirements influenced by past resource consumption data. In at least some examples, the predicted future resource consumption requirements may be applicable to different future time periods for various supply-and-demand systems, e.g., a subsequent minute in a cloud-based computing system. The calculation of the inertial vector is described in greater detail in accordance with FIG. 4.

Figure 5:
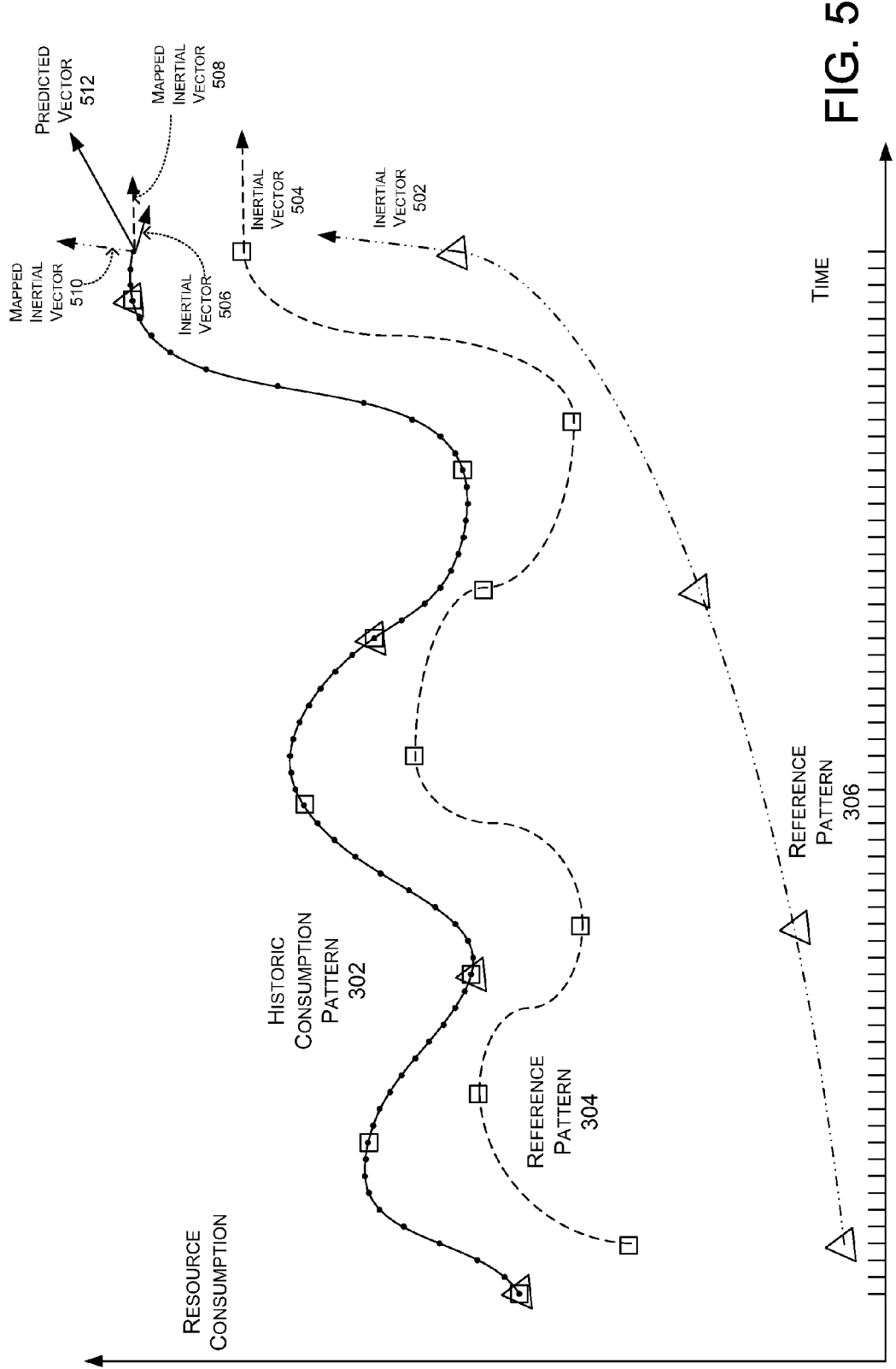
FIG. 5 shows an example predicted vector generated based on the historic consumption pattern and one or more reference patterns on which resource consumption optimization may be based.

Consumption estimator 104C may be further configured to combine the calculated inertial vectors to generate a summed vector (e.g., a predicted vector 512, as shown in FIG. 5) that indicates a variation of resource consumption in a subsequent time period. Thus, consumption estimator 104C may be configured to predict the resource consumption requirements, e.g., demand, in the subsequent time period based on the variation of resource consumption in the subsequent time period and the historic resource consumption data. The combination of the inertial vectors is described in greater detail in accordance with FIG. 5. In accordance with various example embodiments, consumption estimator 104C may be implemented as hardware, software, firmware, or any combination thereof.

Resource allocator 104D may refer to a component that may be configured to allocate, e.g., supply, amounts of the resource supplied by resource suppliers 106 to resource consuming entity 102 during the subsequent time period, in accordance with the predicted resource consumption requirements, e.g., demand. Since the resource consumption requirements during or in the subsequent time period may vary from current resource consumption by resource consuming entity 102, resource allocator 104D may accordingly increase amounts of the resource to be allocated to resource consuming entity 102 or recycle current amounts of the resource consumed by resource consuming entity 102 to avoid waste.

Resource allocator 104D may be configured to determine an amount of the resource that remains available for consumption ("available resource" herein) for one or more resource consuming entities 102. Resource allocator 104D may determine the amount of resource that remains available for consumption prior to allocating the resource. The determination may be made for each of resource suppliers 106. For example, with respect to a server associated with a cloud computing service, the available resource may refer to an amount of network bandwidth that is available for multiple services.

Resource allocator 104D may also be configured to determine current resource consumption by resource consuming entity 102. In at least some examples, the current resource consumption by resource consuming entity 102 may be determined from the aforementioned resource consumption data collected by data collector 104A.

Resource allocator 104D may be configured to allocate portions of the remaining available amount of the resource from one or more of resource suppliers 106 to resource consuming entity 102, when the predicted future resource consumption requirements exceed the current resource consumption determined by resource allocator 104D. Resource allocator 104D may allocate the portions of the resource based on the predicted resource consumption requirements and the determined current resource consumption. For example, when consumption estimator 104C predicts that resource consuming entity 102, e.g., a client device running an application, will use 10 GB more storage space in a subsequent time period than is currently being used, resource allocator 104D may allocate the corresponding storage space from one or more servers associated with the cloud computing service provider to compensate for the predicted deficiency.

Alternatively, resource allocator 104D may be configured to instruct that amounts of the resource currently allocated to resource consuming entity 102 be recycled when the predicted future resource consumption requirements are less than the determined current resource consumption. For example, when consumption estimator 104C predicts that an application running on a client device will consume less network throughput in a subsequent time period than is currently being used, resource allocator 104D may recycle a portion of the network bandwidth currently allocated for the communication of the application, e.g., make the portion of the network bandwidth available for other applications. The portion of the network bandwidth to be recycled may be determined based on the predicted resource consumption requirements and the determined current resource consumption.

Resource supplier 106 may refer to one or more entities that may be configured to supply the corresponding resource to resource consuming entity 102. For example, resource suppliers 106 may refer to one or more servers corresponding to a cloud computing service provider, e.g., Amazon®, Google®, Microsoft®, Verizon®, AT&T®, etc. Each of the one or more servers may supply different amounts of a particular type of computing resources, such as CPU usage, memory space, and network bandwidth, to resource consuming entity 102. The amounts of a particular type of computing resources may be determined by resource allocator 104D based on the predicted resource consumption requirements and the determined current resource consumption.

In the example of where supply-and-demand system 100 includes a cloud computing environment, resource supplier 106A may refer to a first server corresponding to a first cloud computing service provider, e.g., Amazon. Resource supplier 106B may refer to a second server corresponding to a second cloud computing service provider, e.g., Google. Resource supplier 106A and 106B may supply computing resources, respectively from the first and the second cloud computing service providers, to resource consuming entity 102.

Since the resource in supply-and-demand system 100 may be supplied by multiple providers, e.g., resource suppliers 106, resource allocator 104D may also be configured to coordinate the allocation or recycling among multiple providers. That is, resource allocator 104D may be configured to arrange resource suppliers 106 in an ascending order of respective amounts of available resource (e.g., available resource 204) and allocate the available resource in the ascending order. For example, resource allocator 104D may be configured to sequentially allocate the amounts of available resource of resource suppliers 106 in the ascending order until a sum of the sequentially allocated amounts of the resource equal a difference between the predicted future resource consumption requirements and the determined current resource consumption. In a non-limiting example, assuming resource supplier 106A, 106B, and 106C respectively have 1 GB, 2 GB, and 3 GB available memory space and the predicted future memory usage requirement of an application is 4 GB more than the current memory usage, resource allocator 104D may allocate 1 GB from resource supplier 106A, 2 GB from supplier 106B and 1 GB from resource supplier 106C to the application for the subsequent execution time period.

Resource allocator 104D may also be configured to instruct or coordinate the resource recycling among the multiple providers. First, with respect to each of resource suppliers 106, resource allocator 104D may be configured to identify amounts of the resource that are currently allocated to resource consuming entity 102 (e.g., presently consumed resource 202A). For example, resource allocator 104D may identify, with respect to the memory usage of an application, that 1 GB from resource supplier 106A, 2 GB from resource supplier 106B, and 3 GB from resource supplier 106C are currently allocated to the application. Further, resource allocator 104D may be configured to arrange resource suppliers 106A, 106B, and 106C in a descending order of respective amounts of the allocated resources, e.g., in an order of resource supplier 106C, resource supplier 106B, and resource supplier 106A. Further still, resource allocator 104D may be configured to sequentially recycle the allocated amounts of the resource in accordance with the descending order until the recycled amounts of the resource equal a difference between the predicted future resource consumption requirements and the determined current resource consumption. That is, when the predicted future memory usage of the application in the subsequent execution time period is 4 GB lower than the current memory usage, resource allocator 104D may be configured to recycle the 3 GB from resource supplier 106C and 1 GB from resource supplier 106B.

Figure 2:
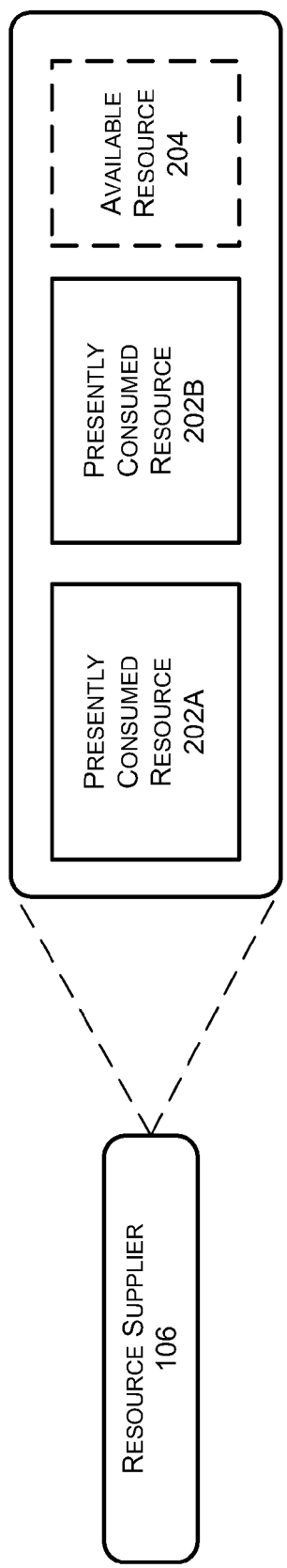
FIG. 2 shows an example resource supplier for which resource consumption may be optimized.

FIG. 2 shows an example resource supplier 106 for which resource consumption may be optimized, arranged in accordance with at least some embodiment described herein. Resource supplier 106 may include, store, or route presently consumed resource 202A, presently consumed resource 202B, and one or more available resources 204.

Presently consumed resource 202A may refer to amounts of a resource that are presently consumed by resource consuming entity 102. In accordance with the examples described above, the resource may refer to computing resources in a cloud-based computing environment, e.g., CPU usage, hard disk space, network throughput, etc. Regarding the cloud-based computing environment example, a portion of the memory space of a server corresponding to a cloud computing service provider may be allocated to resource consuming entity 102.

Presently consumed resource 202B may refer to amounts of the resource that are presently consumed by consuming entities other than resource consuming entity 102. The resource supplied by one of resource suppliers 106 may be allocated to more than one consuming entities.

Available resource 204 may refer to amounts of the resource that may be available for allocation in a subsequent time period. In the above mentioned example, available resource 204 may refer to other portions of the memory space of the physical computing node may be available for other consuming entities.

FIG. 3 shows an example historic consumption pattern 302 and one or more reference patterns 304 and 306 on which resource consumption may be based, arranged in accordance with at least some embodiment described herein. As depicted, historic consumption pattern 302, reference pattern 304, and reference pattern 306 are illustrated on a time-consumption graph.

Historic consumption pattern 302 may refer to a curve that may be generated by pattern generator 104B based on the historic resource consumption data on the time-consumption graph. As a non-limiting example depicted in FIG. 3, the historic resource consumption data may be collected by data collector 104A every sixty seconds over an elapsed period of time. Historic consumption pattern 302 may be generated based on the historic resource consumption data collected by data collector 104A over, e.g., the past 63 minutes. The duration of the elapsed period of time is arbitrarily selected to be 63 minutes for the purpose to illustrate how resource consumption by resource consuming entity 102 varied over the elapsed period of time. But it should be appreciated that other durations of the elapsed period of time, e.g., 84 minutes, 32 minutes, etc., may be contemplated. A horizontal distance between two neighboring dots may represent a time period, e.g., one minute. The 63 dots on the time-consumption graph respectively represent the resource consumption of resource consuming entity 102 after each of the 63 minutes. By connecting the dots, pattern generator 104B may generate historic consumption pattern 302 on the time-consumption graph.

Reference pattern 304 may refer to a curve that may be generated by pattern generator 104B based on a subset of the historic resource consumption data. The subset of the historic resource consumption data may be sampled at a first sampling rate. For example, the historic resource consumption data corresponding to the 63 minutes may be sampled at every 10 minutes from the first minute. The first sampling rate may be predetermined by a system administrator. Theoretically, any sampling rate may be predetermined to be the first sampling rate; however, the system administrator may determine a first sampling rate to yield a relatively accurate prediction in a particular supply-and-demand system. As depicted in FIG. 3, the seven boxes, i.e., 303A, 303B, 303C, 303D, 303E, 303F, and 303G, sampled from the 63 dots by pattern generator 104B, may represent the resource consumption at the first minute, the tenth minute, the 20th minute, the 30th minute, the 40th minute, the 50th minute, and the 60th minute. Pattern generator 104B may generate reference pattern 304 on the time-consumption graph by connecting the boxes in a curvilinear manner. A horizontal distance between two neighboring boxes, e.g., between box 303A and 303B, may similarly represent a time period determined by the first sampling rate, e.g., ten minutes. In the particular example, since the last sampled resource consumption data corresponds to the sixtieth minute instead of the sixty third minute of the entire historic resource consumption data, pattern generator 104B may be configured to move reference pattern 304 horizontally to the effect that reference pattern 304 may be aligned with historic consumption pattern 302.

Reference pattern 306 may refer to a curve that may be generated by pattern generator 104B based on another subset of the historic resource consumption data. The subset of the historic resource consumption data may be sampled at a second sampling rate that is different from the first sampling rate, e.g., every 20 minutes from the first minute. Similar to the first sampling rate, the second sampling rate may be arbitrarily predetermined by the system administrator. As depicted in FIG. 3, the four triangles, 305A, 305B, 305C, and 305D, sampled from the 63 dots by pattern generator 104B may represent the resource consumption at, e.g., the first minute, the twentieth minute, the fortieth minute, and the sixtieth minute. A horizontal distance between two neighboring triangles, e.g., triangles 305A and 305B, may similarly represent a time period, e.g., 20 minutes. Pattern generator 104B may generate reference pattern 306 on the time-consumption graph by connecting the triangles in a curvilinear manner. For the same reason above, pattern generator 104B may be configured to move reference pattern 306 horizontally to the effect that reference pattern 306 may be aligned with historic consumption pattern 302.

Figure 4:
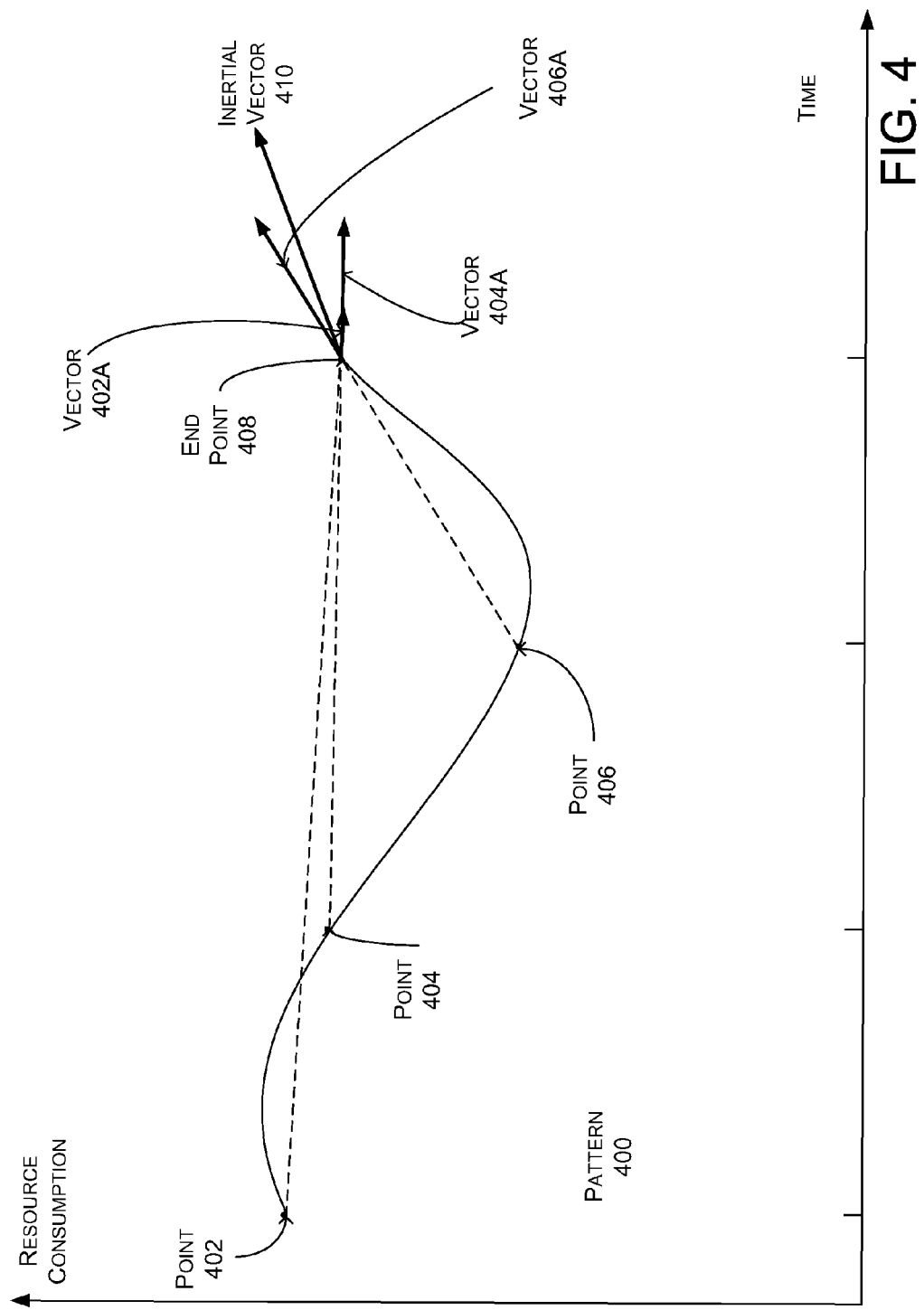
FIG. 4 shows an example computer generated consumption pattern on which resource consumption optimization may be based.

FIG. 4 shows an example computer generated consumption pattern 400 which resource consumption may be based, arranged in accordance with at least some embodiment described herein. As depicted, pattern 400 may include, at least, a point 402, a point 404, a point 406, and an end point 408. Point 402, point 404, and point 406, respectively combined with end point 408, may generate a vector 402A, a vector 404A, and a vector 406A. An inertial vector 410 may be generated at end point 408 based on vector 402A, vector 404A, and vector 406A.

Pattern 400 may refer to a portion of one of historic consumption pattern 302 and the reference patterns generated by pattern generator 104B (e.g., reference pattern 304 or reference pattern 306). As depicted in FIG. 3 and here, pattern 400 may include multiple points. Each of the point may respectively represent amounts of the resource consumed by resource consuming entity 102 at a given time. In at least some examples, a horizontal distance between two neighboring points of pattern 400 may represent a time period.

Point 402, point 404, point 406, and end point 408 may refer to four consecutive points on pattern 400. Each of the four consecutive points may respectively represent resources consumed by resource consuming entity 102 at a given time. End point 408 may refer to a last point on pattern 400.

Vector 402A may refer to a vector, generated by pattern generator 104B, that originates from end point 408. The direction of vector 402A may be determined, by pattern generator 104B, by extending a line that connects point 402 and end point 408. The magnitude of vector 402A may be determined by the following formula.

$$\frac{|\overline{a_i, e}|}{timeDistance(a_i, e)}$$

in which $\overline{a_i, e}$ refers to the distance between point 402 and end point 408, and timeDistance($a_i$, e) refers to the horizontal distance between point 402 and point 408.

Similar to vector 402A, vector 404A may refer to a vector that originates from end point 408. The direction of vector 404A may be determined, by pattern generator 104B, by extending a line that connects point 404 and end point 408. The magnitude of vector 404A may be similarly determined, by pattern generator 104B, by the formula above, in which $|\overline{a_i, e}|$ refers to the distance between point 404 and end point 408 and timeDistance($a_i$, e) refers to the horizontal distance between point 404 and point 408.

Similar to vector 402A, vector 406A may refer to a vector that originates from end point 408. The direction of vector 406A may be determined, by pattern generator 104B, by extending a line that connects point 406 and end point 408. The magnitude of vector 406A may be similarly determined, by pattern generator 104B, by the formula above, in which $|\overline{a_i, e}|$ refers to the distance between point 406 and end point 408 and timeDistance($a_i$, e) refers to the horizontal distance between point 406 and point 408.

Based on vectors 402A, 404A, and 406A, inertial vector 410 may be generated by consumption estimator 104C by adding vectors 402A, 404A, and 406A in accordance with laws of vector addition.

FIG. 5 shows an example predicted vector 512 generated based on the historic consumption pattern and one or more reference patterns on which resource consumption may be based, arranged in accordance with at least some embodiment described herein. As depicted, predicted vector 512 may be generated based on an inertial vector 502, an inertial vector 504, an inertial vector 506, a mapped inertial vector 508, and a mapped inertial vector 510.

Inertial vector 502 may refer to an inertial vector generated, by pattern generator 104B, based on reference pattern 306 in accordance with the description in FIG. 4. Similarly, inertial vector 504 and inertial vector 506 may respectively refer to an inertial vector generated, by pattern generator 104B, based on reference pattern 304 and historic consumption pattern 302.

Mapped inertial vector 508 may refer to a vector generated, by pattern generator 104B, by mapping inertial vector 504 to historic consumption pattern 302 so that mapped inertial vector 508 may originate from a last point of historic consumption pattern 302. The direction of mapped inertial vector 508 may remain the same as inertial vector 504. The magnitude of mapped inertial vector 508 may be determined as the magnitude of inertial vector 504 multiplied by an affinity degree. The affinity degree may be determined, by pattern generator 104B, by the following formula.

$$\lambda_1 \times \text{distance } (n_1, n_2) + \lambda_2 \times \frac{\text{min time scale}}{\text{max time scale}}$$

in which $\lambda_1$ and $\lambda_2$ may respective refer to an adjustable value, distance ($n_1$, $n_2$) may refer to the time period between the last point of historic consumption pattern 302 and the last point of reference pattern 304, min time scale may refer to the time period between two consecutive points on historic consumption pattern 302, and max time scale may refer to the time period between two consecutive points on reference pattern 304.

Similar to mapped inertial vector 508, mapped inertial vector 510 may refer to a vector generated, by pattern generator 104B, by mapping inertial vector 502 to historic consumption pattern 302 so that mapped inertial vector 510 may originate from the last point of historic consumption pattern 302. The direction of mapped inertial vector 510 may remain the same as inertial vector 502. The magnitude of mapped inertial vector 510 may be determined as the magnitude of inertial vector 502 multiplied by the affinity degree. The affinity degree may be determined, by the formula above, in which $\lambda_1$ and $\lambda_2$ may respective refer to an adjustable value, distance ($n_1$, $n_2$) may refer to the time period between the last point of historic consumption pattern 302 and the last point of reference pattern 306, min time scale may refer to the time period between two consecutive points on historic consumption pattern 302, and max time scale may refer to the time period between two consecutive points on reference pattern 306.

Based on mapped inertial vector 508 and mapped inertial vector 510, predicted vector 512 may be generated to represent the predicted future consumption requirements in the subsequent time period. That is, consumption estimator 104C may be configured to add inertial vector 506, mapped inertial vector 508, and mapped inertial vector 510 to generate predicted vector 512.

Figure 6:
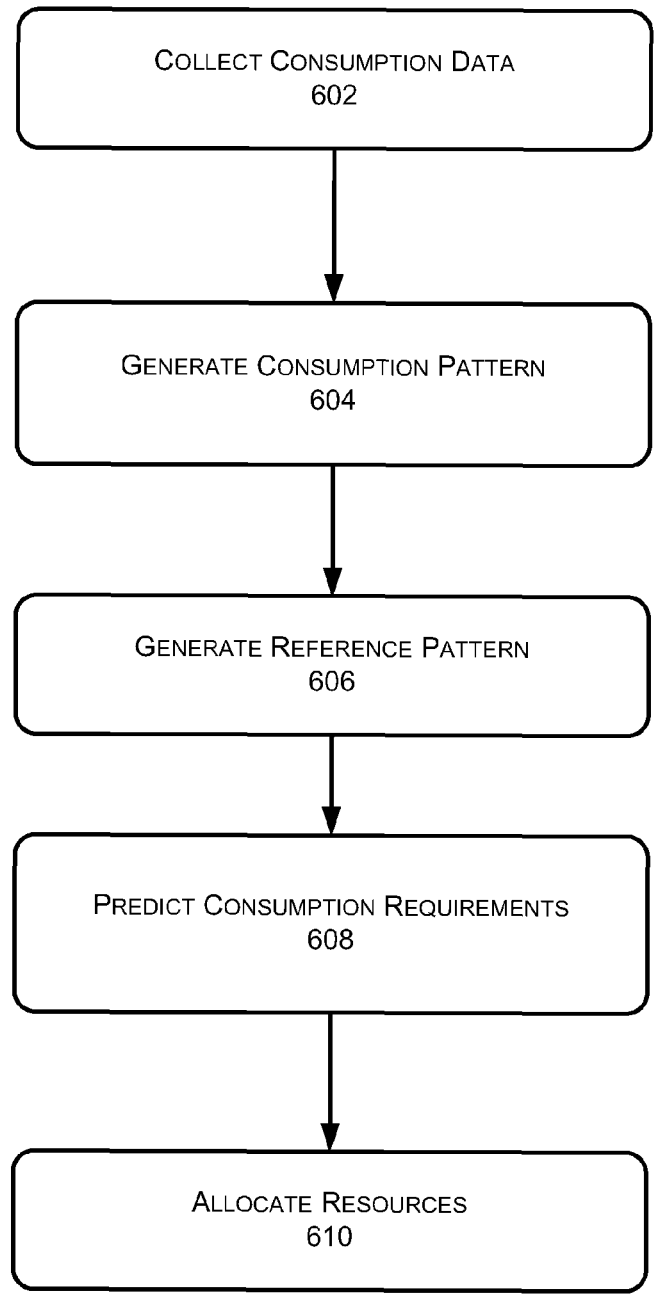
FIG. 6 shows an example processing flow by which resource consumption may be optimized.

FIG. 6 shows an example processing flow 600 by which resource consumption may be optimized, arranged in accordance with at least some embodiment described herein. As depicted, processing flow 600 may include sub-processes executed by various components that are part of example system 100. However, processing flow 600 is not limited to such components, and modification may be made by re-ordering two or more of the sub-processes described here, eliminating at least one of the sub-processes, adding further sub-processes, substituting components, or even having various components assuming sub-processing roles accorded to other components in the following description. Processing flow 600 may include various operation, functions, or actions as illustrated by one or more of blocks 602, 604, 606, 608, and/or 610. Processing may begin at block 602.

Block 602 (Collect Consumption Data) may refer to data collector 104A collecting or receiving the resource consumption data from resource consuming entity 102. For example, with regard to a cloud computing service provider, data collector 104A may be configured to receive data that indicates the computing resources consumed by resource consuming entity 102 in a past time period. The resource consumption data collected during multiple previous time periods may be compiled by data collector 104A as the historic resource consumption data that may serve as a basis for predicting the future resource consumption requirements. The duration of the time periods may be adjustable by a system administrator. Such compiled historic resource consumption data may be shared with pattern generator 104B. Block 602 may be followed by block 604.

Block 604 (Generate Consumption Pattern) may refer to pattern generator 104B generating an historic resource consumption pattern (e.g., historic consumption pattern 302) based on the historic resource consumption data. For example, regarding a cloud computing service provider, pattern generator 104B may produce a pattern of historic computing-resource usage that may be articulated on a time-consumption graph as a curve that describes computing resource consumption varying with time. An example of such curve is described above with regard to FIG. 3. Further to such example, an historic resource consumption pattern may describe a CPU usage of an application, which varied over an elapsed time period. Block 604 may be followed by block 606.

Block 606 (Generate Reference Pattern) may refer to pattern generator 104B generating one or more reference patterns based on one or more sampled portions of the historic resource consumption data. That is, pattern generator 104B may be configured to sample the collected historic consumption data at different sampling rates. At each of the sampling rates, pattern generator 104B may sample a subset of the historic consumption data to generate one of the one or more reference patterns. Further to the above mentioned example, pattern generator 104B may sample the computing resource consumption data, e.g., once a minute, once every ten minutes, and once every twenty minutes to generate three subsets of the historic resource consumption data. Based on the three sampling rates, three reference patterns may be respectively generated to describe the CPU usage of the application, as varied over the aforementioned intervals during a period of time, e.g., the past 24 hours. Block 606 may be followed by block 608.

Block 608 (Predict Consumption Requirements) may refer to consumption estimator 104C predicting resource consumption requirements of resource consuming entity 102 in a subsequent time period based on the historic resource consumption pattern and the one or more reference patterns. While making the prediction, consumption estimator 104C may calculate an inertial vector for each of the reference patterns and the historic resource consumption pattern. Based on the calculated inertial vectors, in accordance with the description regarding FIG. 5 above, consumption estimator 104C may be configured to combine the inertial vectors to generate a summed vector that indicates a consumption variation in the subsequent time period. Based on the consumption variation and the historic resource consumption data, consumption estimator 104C may predict the resource consumption requirements in the subsequent time period. Block 608 may be followed by block 610.

Block 610 (Allocate Resources) may refer to resource allocator 104D allocating the amounts of the resource to resource consuming entity 102 in the subsequent time period or recycling amount of the resource currently consumed by resource consuming entity 102 in accordance with the predicted resource consumption requirements.

Resource allocator 104D may be configured to determine, for each of resource providers 106 prior to allocating the resources to resource consuming entity 102, "available resource" as described above in accordance with FIG. 1 and a current resource consumption by resource consuming entity 102. In at least some examples, the current resource consumption of resource consuming entity 102 may be determined from the aforementioned resource consumption data collected by data collector 104A.

Resource allocator 104D may be configured to allocate the available resources of resource providers 106 to resource consuming entity 102, when the predicted resource consumption requirements are greater than the determined current resource consumption.

Alternatively, resource allocator 104D may be configured to recycle the resources currently allocated to resource consuming entity 102, when the predicted future resource consumption requirements are less than the determined current resource consumption. For example, when consumption estimator 104C predicts that an application may likely consume less network throughput in a subsequent time period than is currently consumed, resource allocator 104D may be configured to recycle a portion of the network bandwidth currently allocated for the communication of the application, e.g., make the portion of the network bandwidth available for other applications.

Since the resources in supply-and-demand system 100 may be supplied by multiple providers, e.g., resource suppliers 106, resource allocator 104D may also be configured to coordinate the allocation or recycling among the multiple providers. That is, resource allocator 104D may be configured to arrange resource suppliers 106 in an ascending order of respective amounts of available resource (e.g., available resource 204) and allocate the available resource according to the ascending order. For example, resource allocator 104D may be configured to sequentially allocate the amounts of the available resource of resource suppliers 106 in the ascending order until the sequentially allocated amounts of the resource equal a difference between the predicted future resource consumption requirements and the determined current resource consumption. In a non-limiting example, assuming resource supplier 106A, 106B, and 106C respectively have 1 GB, 2 GB, and 3 GB available memory space and the predicted future memory usage requirement of an application is 4 GB more than the current memory usage, resource allocator 104D may allocate 1 GB from resource supplier 106A, 2 GB from supplier 106B and 1 GB from resource supplier 106C to the application for the subsequent execution time period.

Similar to the allocation, resource allocator 104D may also be configured to recycle the resource among the multiple providers. First, with respect to each of resource suppliers 106D, resource allocator 104D may be configured to identify the amounts of the resource allocated to resource consuming entity 102 (e.g., presently consumed resource 202A). For example, resource allocator 104D may identify, with respect to the memory usage of an application, that 1 GB from resource supplier 106A, 2 GB from resource supplier 106B, and 3 GB from resource supplier 106C are currently allocated to the application. Further, resource allocator 104D may be configured to arrange resource suppliers 106A, 106B, and 106C in a descending order of respective amounts of the allocated resources, e.g., in an order of resource supplier 106C, resource supplier 106B, and resource supplier 106A. Further still, resource allocator 104D may be configured to sequentially recycle the allocated amounts of the resource in accordance with the descending order until the recycled amounts of the resource equal a difference between the predicted resource consumption requirements and the determined current resource consumption. That is, when the predicted memory usage of the application in the subsequent execution time period is 4 GB lower than the current memory usage, resource allocator 104D may be configured to recycle the 3 GB from resource supplier 106C and 1 GB from resource supplier 106B.

One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

Figure 7:
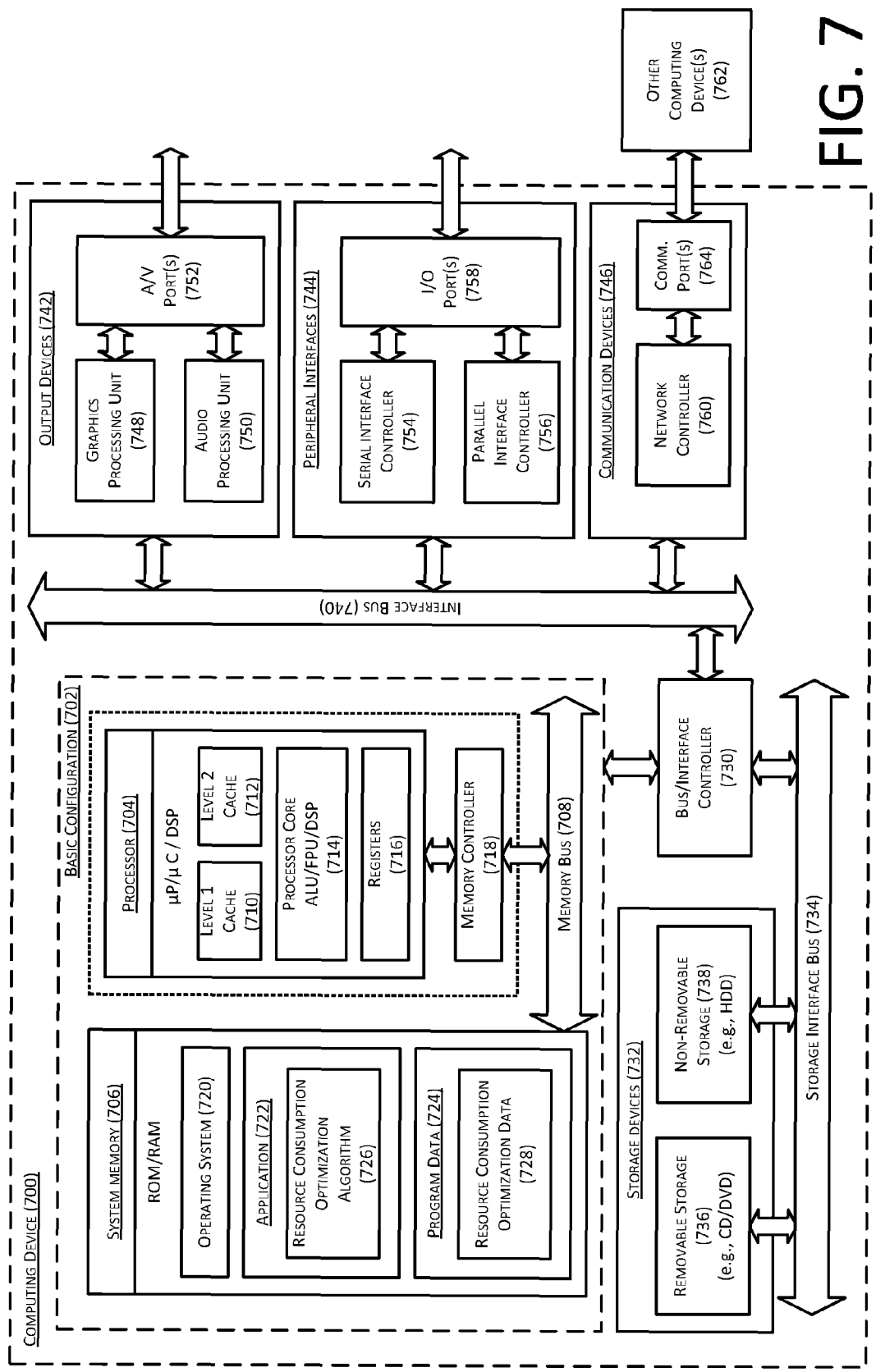
FIG. 7 shows a block diagram illustrating an example computing device that is arranged for optimizing resource consumption, all arranged in accordance with at least some embodiment described herein.

FIG. 7 shows a block diagram illustrating an example computing device 700 that is arranged for optimizing resource consumption, arranged in accordance with at least some embodiment described herein.

In a very basic configuration 702, computing device 700 typically includes one or more processors 704 and a system memory 706. A memory bus 708 may be used for communicating between processor 704 and system memory 706.

Depending on the desired configuration, processor 704 may be of any type including but not limited to a microprocessor (μP), a microcontroller (μC), a digital signal processor (DSP), or any combination thereof. Processor 704 may include one more levels of caching, such as a level one cache 710 and a level two cache 712, a processor core 714, and registers 716. An example processor core 714 may include an arithmetic logic unit (ALU), a floating point unit (FPU), a digital signal processing core (DSP Core), or any combination thereof. An example memory controller 718 may also be used with processor 704, or in some implementations memory controller 718 may be an internal part of processor 704.

Depending on the desired configuration, system memory 706 may be of any type including but not limited to volatile memory (such as RAM), non-volatile memory (such as ROM, flash memory, etc.) or any combination thereof. System memory 706 may include an operating system 720, one or more applications 722, and program data 724. Application 722 may include a resource consumption optimization algorithm 726 that is arranged to perform the functions as described herein including those described with respect to process 600 of FIG. 6. Program data 724 may include resource consumption optimization data 728 that may be useful for operation with resource consumption optimization algorithm 726 as is described herein. In some embodiments, application 722 may be arranged to operate with program data 724 on operating system 720 such that implementations of resource consumption optimization may be provided as described herein. This described basic configuration 702 is illustrated in FIG. 7 by those components within the inner dashed line.

Computing device 700 may have additional features or functionality, and additional interfaces to facilitate communications between basic configuration 702 and any required devices and interfaces. For example, a bus/interface controller 730 may be used to facilitate communications between basic configuration 702 and one or more data storage devices 732 via a storage interface bus 734. Data storage devices 732 may be removable storage devices 736, non-removable storage devices 738, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

System memory 706, removable storage devices 736 and non-removable storage devices 738 are examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by computing device 700. Any such computer storage media may be part of computing device 700.

Computing device 700 may also include an interface bus 740 for facilitating communication from various interface devices (e.g., output devices 742, peripheral interfaces 744, and communication devices 746) to basic configuration 702 via bus/interface controller 730. Example output devices 742 include a graphics processing unit 748 and an audio processing unit 750, which may be configured to communicate to various external devices such as a display or speakers via one or more A/V ports 752. Example peripheral interfaces 744 include a serial interface controller 754 or a parallel interface controller 756, which may be configured to communicate with external devices such as input devices (e.g., keyboard, mouse, pen, voice input device, touch input device, etc.) or other peripheral devices (e.g., printer, scanner, etc.) via one or more I/O ports 758. An example communication device 746 includes a network controller 760, which may be arranged to facilitate communications with one or more other computing devices 762 over a network communication link via one or more communication ports 764.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

Computing device 700 may be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 700 may also be implemented as a personal computer including both laptop computer and non-laptop computer configurations.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds, compositions or biological systems, which can, of course, vary. It is also to be understood that the terminology used herein is for the purpose of describing particular embodiments only, and is not intended to be limiting.

In an illustrative embodiment, any of the operations, processes, etc. described herein can be implemented as computer-readable instructions stored on a computer-readable medium. The computer-readable instructions can be executed by a processor of a mobile unit, a network element, and/or any other computing device.

There is little distinction left between hardware and software implementations of aspects of systems; the use of hardware or software is generally (but not always, in that in certain contexts the choice between hardware and software can become significant) a design choice representing cost vs. efficiency tradeoffs. There are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a CD, a DVD, a digital tape, a computer memory, etc.; and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems.

The herein described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases at least one and one or more to introduce claim recitations. However, the use of such phrases should not be construed to imply that the introduction of a claim recitation by the indefinite articles "a" or an limits any particular claim containing such introduced claim recitation to embodiments containing only one such recitation, even when the same claim includes the introductory phrases one or more or at least one and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

We claim:

1. A method for optimizing resource consumption comprising:
   collecting historic resource consumption data of an application executing on one or more computing nodes;
   generating a historic resource consumption pattern based on the historic resource consumption data;
   generating one or more reference patterns based on the historic resource consumption data;
   predicting resource consumption requirements of the application during a subsequent execution time period based on the historic resource consumption pattern and the one or more reference patterns, wherein the predicting comprises:
   calculating multiple inertial vectors for the historic resource consumption pattern and each of the one or more reference patterns, and
   generating a summed vector by combining the multiple inertial vectors to indicate a resource consumption variation in the subsequent execution time period, and wherein the generating the summed vector comprises:
   calculating an affinity value for each of the multiple inertial vectors calculated for the one or more reference patterns, and
   mapping the multiple inertial vectors calculated for the one or more reference patterns to the historic resource consumption pattern based on the calculated affinity value; and
   allocating computing resources of the one or more computing nodes for execution of the application in the subsequent execution time period based on the predicted resource consumption requirements.

2. The method of claim 1, wherein the generating the one or more reference patterns comprises:
   sampling the collected historic resource consumption data at different sampling rates; and
   selecting a subset of the sampled historic resource consumption data to generate one of the one or more reference patterns.

3. The method of claim 1, wherein the allocating comprises:
   determining, for each of the one or more computing nodes, total computing resources including presently consumed computing resources and available computing resources;
   determining a current resource consumption of the application;
   allocating the available computing resources to the application when the predicted resource consumption requirements are greater than the determined current resource consumption; and
   recycling one or more of the computing resources allocated to the application when the predicted resource consumption requirements are less than the determined current resource consumption.

4. The method of claim 3, wherein the allocating of the available computing resources comprises:
   arranging the one or more computing nodes in an ascending order of respective amounts of available computing resources; and
   sequentially allocating the available computing resources of the one or more computing nodes in the ascending order until the allocated computing resources equal a difference between the predicted resource consumption requirements and the determined current resource consumption.

5. The method of claim 3, wherein the recycling comprises:
   identifying, for each of the one or more computing nodes, the one or more computing resources allocated to the application;
   arranging the one or more computing nodes in a descending order of respective amounts of the allocated computing resources; and
   sequentially recycling the allocated computing resources in accordance with the descending order until the recycled allocated computing resources equal a difference between the predicted resource consumption requirements and the determined current resource consumption.

6. A non-transitory computer-readable medium that stores executable-instructions that, when executed, cause one or more processors to perform operations comprising:
   collecting historic power consumption data by a consuming entity that consumes power from one or more power providers;
   generating a historic power consumption pattern based on the collected historic power consumption data;
   generating one or more reference patterns based on the generated historic power consumption data;
   predicting power consumption requirements of the consuming entity during a subsequent time period based on the historic power consumption pattern and the one or more reference patterns, wherein the predicting comprises:

calculating multiple inertial vectors for the historic power consumption pattern and each of the one or more reference patterns, and generating a summed vector by combining the multiple inertial vectors to indicate a power consumption variation in the subsequent time period, and wherein the generating comprises:

calculating an affinity value for each of the multiple inertial vectors calculated for the one or more reference patterns, and mapping the multiple inertial vectors calculated for the one or more reference patterns to the historic power consumption pattern based on the calculated affinity value; and allocating power from the one or more power providers to the consuming entity in the subsequent time period based on the predicted power consumption requirements.

7. The computer-readable medium of claim 6, wherein the generating the one or more reference patterns comprises:
sampling the collected historic power consumption data at different sampling rates; and
selecting a subset of the sampled historic power consumption data to generate one of the one or more reference patterns.

8. The computer-readable medium of claim 6, wherein the allocating comprises:
determining, for each of the one or more power providers, total power including presently consumed power and available power;
determining a current power consumption by the consuming entity;
allocating the available power to the consuming entity when the predicted power consumption requirements are greater than the current power consumption; and
reallocating power allocated to the consuming entity to other consuming entities when the predicted power consumption requirements are less than the current power consumption.

9. The computer-readable medium of claim 8, wherein the allocating the available power comprises:
arranging the one or more power providers in an ascending order of the available power; and
sequentially allocating the power of the one or more power providers in the ascending order until the allocated power equals a difference between the predicted power consumption requirements and the determined current power consumption.

10. The computer-readable medium of claim 8, wherein the reallocating comprises:
identifying, for each of the one or more power providers, the power allocated to the consuming entity;
arranging the one or more power providers in a descending order of respective amounts of the allocated power; and
sequentially reallocating the allocated power in accordance with the descending order until the reallocated power equals a difference between the predicted power consumption requirements and the determined current power consumption.

11. A system, comprising:
a processor coupled to a memory that stores program instructions, wherein when the processor executes the program instructions, the system is configured to:
collect historic resource consumption data of an application that executes on one or more computing nodes;

generate a historic resource consumption pattern based on the collected historic resource consumption data;

generate one or more reference patterns based on the collected historic resource consumption data;

predict resource consumption requirements of the application in a subsequent execution time period based on the historic resource consumption pattern and the one or more reference patterns, wherein to predict, the system is configured to:

calculate multiple inertial vectors for the historic resource consumption pattern and each of the one or more reference patterns, and generate a summed vector by combining the multiple inertial vectors, wherein the summed vector indicates a consumption variation in the subsequent execution time period, and wherein to generate the summed vector, the system is configured to:

calculate an affinity value for each of the multiple inertial vectors calculated for the one or more reference patterns, and map the multiple inertial vectors calculated for the one or more reference patterns to the historic resource consumption pattern based on the calculated affinity value; and allocate computing resources of the one or more computing nodes for execution of the application in the subsequent execution time period based on the predicted resource consumption requirements.

12. The system of claim 11, wherein to generate the one or more reference patterns, the system is configured to:
sample the collected historic resource consumption data at different sampling rates; and
select a subset of the sampled historic resource consumption data to generate one of the one or more reference patterns.

13. The system of claim 11, wherein to allocate the computing resources, the system is further configured to:
determine, for each of the one or more computing nodes, total computing resources including presently consumed computing resources and available computing resources;
determine a current resource consumption of the application;
allocate the available computing resources to the application when the predicted resource consumption requirements are greater than the determined current resource consumption; and
recycle one or more computing resources previously allocated to the application when the predicted resource consumption requirements area less than the determined current resource consumption.

14. The system of claim 13, wherein to allocate the available computing resources, the system is further configured to:
arrange the one or more computing nodes in an ascending order of respective amounts of the available computing resources; and
sequentially allocate the computing resources of the one or more computing nodes in accordance with the ascending order until the allocated computing resources equal a difference between the predicted resource consumption requirements and the determined current consumption.

15. The system of claim 13, wherein to recycle, the system is further configured to:
- identify, for each of the one or more computing nodes, the one or more computing resources allocated to the application;
- arrange the one or more computing nodes in a descending order of respective amounts of the allocated computing resources; and
- sequentially recycle the allocated one or more computing resources in accordance with the descending order until the recycled allocated computing resources equal a difference between the predicted resource consumption requirements and the determined current consumption.

* * * * *

UNITED STATES PATENT AND TRADEMARK OFFICE
CERTIFICATE OF CORRECTION

PATENT NO. : 9,753,782 B2
APPLICATION NO. : 14/655407
DATED : September 5, 2017
INVENTOR(S) : Fang et al.

It is certified that error appears in the above-identified patent and that said Letters Patent is hereby corrected as shown below:

On the Title Page

In item (71), under "Applicant", in Column 1, Lines 1-2, delete "Empire Technology Development LLC., Wilmington, DE (US)" and insert -- Empire Technology Development LLC, Wilmington, DE (US) --, therefor.

In the Specification

In Column 18, Line 41, delete "at least one and one or more" and insert -- "at least one" and "one or more" --, therefor.

In Column 18, Line 44, delete "or an" and insert -- or "an" --, therefor.

In Column 18, Lines 47-48, delete "one or more or at least one" and insert -- "one or more" or "at least one" --, therefor.

Signed and Sealed this
Fifth Day of December, 2017

Joseph Matal
*Performing the Functions and Duties of the
Under Secretary of Commerce for Intellectual Property and
Director of the United States Patent and Trademark Office*